US006374272B2

(12) United States Patent
Bates et al.

(10) Patent No.: US 6,374,272 B2
(45) Date of Patent: *Apr. 16, 2002

(54) SELECTING OVERLAPPING HYPERTEXT LINKS WITH DIFFERENT MOUSE BUTTONS FROM THE SAME POSITION ON THE SCREEN

(75) Inventors: Cary Lee Bates; Paul Reuben Day, both of Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,917

(22) Filed: Mar. 16, 1998

(51) Int. Cl.[7] .................................................. G06F 3/00
(52) U.S. Cl. ..................... 707/513; 707/501.1; 345/156; 345/157; 345/163; 345/164
(58) Field of Search .................................. 707/501, 513; 345/145, 146, 642.164, 156–159, 163

(56) References Cited

U.S. PATENT DOCUMENTS

| | | | | |
|---|---|---|---|---|
| 4,698,625 A | * | 10/1987 | McCaskill et al. | 340/709 |
| 4,803,474 A | * | 2/1989 | Kulp | 340/709 |
| 5,204,947 A | * | 4/1993 | Bernstein et al. | 395/157 |
| 5,565,888 A | * | 10/1996 | Selker | 345/146 |
| 5,680,562 A | * | 10/1997 | Conrad et al. | 395/342 |
| 5,736,974 A | * | 4/1998 | Selker | 345/146 |
| 5,736,985 A | * | 4/1998 | Lection et al. | 395/354 |
| 5,745,100 A | * | 4/1998 | Bates et al. | 345/157 |
| 5,754,177 A | * | 5/1998 | Hama et al. | 345/862 |
| 5,790,122 A | * | 8/1998 | Cecchini et al. | 345/357 |
| 5,806,077 A | * | 9/1998 | Wecker | 707/501 |
| 5,808,601 A | * | 9/1998 | Leah et al. | 345/145 |
| 5,809,317 A | * | 9/1998 | Kogan et al. | 395/762 |
| 5,844,557 A | * | 12/1998 | Shively, II | 345/339 |
| 5,877,766 A | * | 3/1999 | Bates et al. | 345/357 |
| 5,878,223 A | * | 3/1999 | Becker et al. | 395/200.53 |
| 5,905,991 A | * | 5/1999 | Reynolds | 707/501 |
| 5,937,417 A | * | 8/1999 | Nielsen | 707/513 |
| 5,956,025 A | * | 9/1999 | Goulden et al. | 345/327 |
| 6,049,326 A | | 4/2000 | Beyda et al. | 345/157 |

FOREIGN PATENT DOCUMENTS

| | | |
|---|---|---|
| EP | 0918277 A2 | 5/1999 |
| GB | 2336226 A | 10/1999 |

OTHER PUBLICATIONS

Oliver, Dick, et al., "Netscape 3 Unleashed, second edition", Sams.net Publishing, pp. 4, 5, 18, 19, 899–902, 1996.*

* cited by examiner

Primary Examiner—Stephen S. Hong
Assistant Examiner—Cesar B. Paula
(74) Attorney, Agent, or Firm—Wood, Herron & Evans, LLP; Steven W. Roth

(57) ABSTRACT

A computer system, program product and method utilize an input region defined for a hypertext link that is capable of receiving user input for the hypertext link outside of a display region thereof to perform a predetermined operation with the hypertext link. At least a portion of the input region is disposed outside of the display region of the hypertext link, thereby expanding the hot spot. As a result, when a user performs a specific action while a pointer is disposed within the input region of the hypertext link, the predetermined operation (e.g., activating the hypertext link) is performed. In addition, conflicts between multiple user interface controls (e.g., hypertext links) disposed proximate one another may be resolved by defining a secondary operation for a second user interface control that may be activated in response to user input that occurs when a pointer is disposed within an input region defined for a first user interface control.

20 Claims, 7 Drawing Sheets

SELECTING OVERLAPPING HYPERTEXT LINKS WITH DIFFERENT MOUSE BUTTONS FROM THE SAME POSITION ON THE SCREEN

FIELD OF THE INVENTION

The invention is generally related to computers and computer software. More specifically, the invention is generally related to a manner of interfacing with user interface controls displayed on a computer display.

BACKGROUND OF THE INVENTION

Hypertext linking has become an extremely popular manner of interfacing with a computer due to its intuitiveness, simplicity and efficiency. With hypertext linking, a user is permitted to navigate between documents and/or between different locations in the same document simply by moving a pointer over a hypertext link and selecting the hypertext link by depressing a key or button (a process known as "pointing and clicking").

Hypertext links often include text embedded within a text string that is highlighted to identify the text as a hypertext link. As such, a user is often able to navigate by directly selecting the text from a portion of a text string. For example, a text string such as "the winner of the 1973 Kentucky Derby was Secretariat" might have a hypertext link defined for the word "Secretariat", such that a user might be able to view a separate document with Secretariat's career racing statistics simply by pointing and clicking on the word "Secretariat".

A principal use of hypertext linking is in retrieving information from the Internet, and specifically, a portion of the Internet known as the World Wide Web ("the Web"). Moreover, due to the ever-increasing popularity of the Web, many private networks, as well as other applications local to a user's workstation, now use hypertext linking to access and navigate between documents. Documents are typically formatted using a standard language known as the Hypertext Markup Language (HTML), and are viewed using a computer software application known as a web or hypertext browser. Browsers typically display all or a portion of a particular document in one or more graphical windows.

One problem associated with hypertext linking is that to date a user has been required to position a pointer directly over a hypertext link in order to activate the hypertext link. Typically, activation of a hypertext link requires that the pointer be located within a display region of a hypertext link—that is, within the extent of a display representation of the hypertext link on a computer display.

However, in a number of circumstances, it can be difficult for a user to accurately and efficiently position a pointer over the display region of a hypertext link. These circumstances may include, for example, if the pointer speed is set relatively high, if a user's hand is somewhat shaky, if the display region of a hypertext link is relatively small, and/or if there are several hypertext links disposed in close proximity to one another (as in a list).

Also, some user interface devices may have relatively poor granularity, and may be difficult to position accurately. For example, on many notebook computers, trackball, Accupoint or touch pad user interface devices are often used, which many users find to be more difficult to control than a mouse. In addition, many PC/TV's—that is, integrated televisions and home computers—use a remote control to provide wireless control over a pointer. Remote controls have been found to be particularly imprecise compared to a mouse.

When a user is unable to efficiently and accurately select hypertext links, the user's overall productivity decreases while the user's level of frustration increases. Moreover, when a user accidentally selects an unintended hypertext link (e.g., when two hypertext links are positioned in close proximity with one another), additional time and productivity may be lost in navigating back to the original document and selecting the originally intended hypertext link.

Therefore, a significant need continues to exist for a manner of simplifying the selection of user interface controls, and in particular, the selection of hypertext links, with a user-actuated pointer.

SUMMARY OF THE INVENTION

The invention addresses these and other problems associated with the prior art by providing a computer system, program product and method in which an input region is defined for a hypertext link that is capable of receiving user input for the hypertext link outside of a display region thereof to perform a predetermined operation with the hypertext link. At least a portion of the input region is disposed outside of the display region of the hypertext link. As a result, when a user performs a specific action while a pointer is disposed within the input region of the hypertext link, the predetermined operation (e.g., activating the hypertext link) is performed. Put another way, a user is able to perform a predetermined operation such as selecting a hypertext link even when the pointer is disposed close to, but not directly over, the hypertext link. Less accuracy is required when positioning a pointer, which minimizes errors and increases productivity.

In addition, with some embodiments of the invention, conflicts between multiple user interface controls (e.g., hypertext links) disposed proximate one another may be resolved in a unique manner to facilitate user actuation of either control. In particular, a secondary operation may be defined for a second user interface control that may be activated in response to user input that occurs when a pointer is disposed within an input region defined for a first user interface control.

Without limiting the invention to a particular implementation, it may be desirable in some embodiments to actuate the primary and secondary operations using different buttons on a user interface device, as well as to highlight the first and second user interface controls with distinct visual representations to indicate to a user the available operations that may be performed. Moreover, it may be desirable to visually link the display representations of the hypertext links with the pointer to further assist the user in performing the operations, e.g., through color coordinating the display representations with buttons on a graphical pointer representation.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described various embodiments of the invention.

DETAILED DESCRIPTION

Hardware Environment

Figure 1:
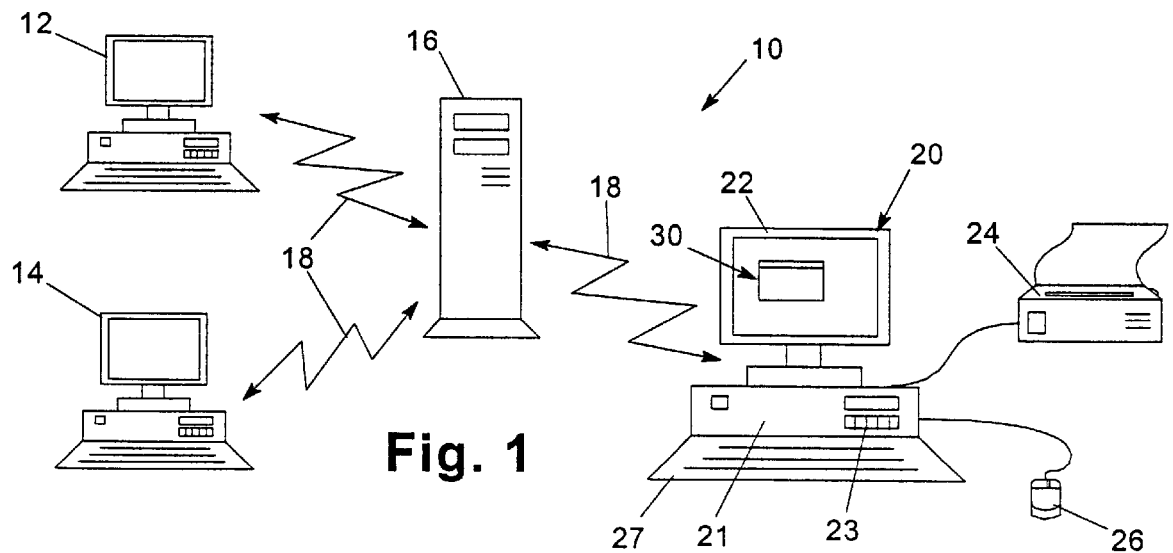
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various user input devices (e.g., a mouse 26 and keyboard 27), among others. Computer system 20 operates under the control of an operating system and executes various computer software applications, programs, objects, modules, etc. (e.g., a browser 30) as is well known in the art. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs" or "programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
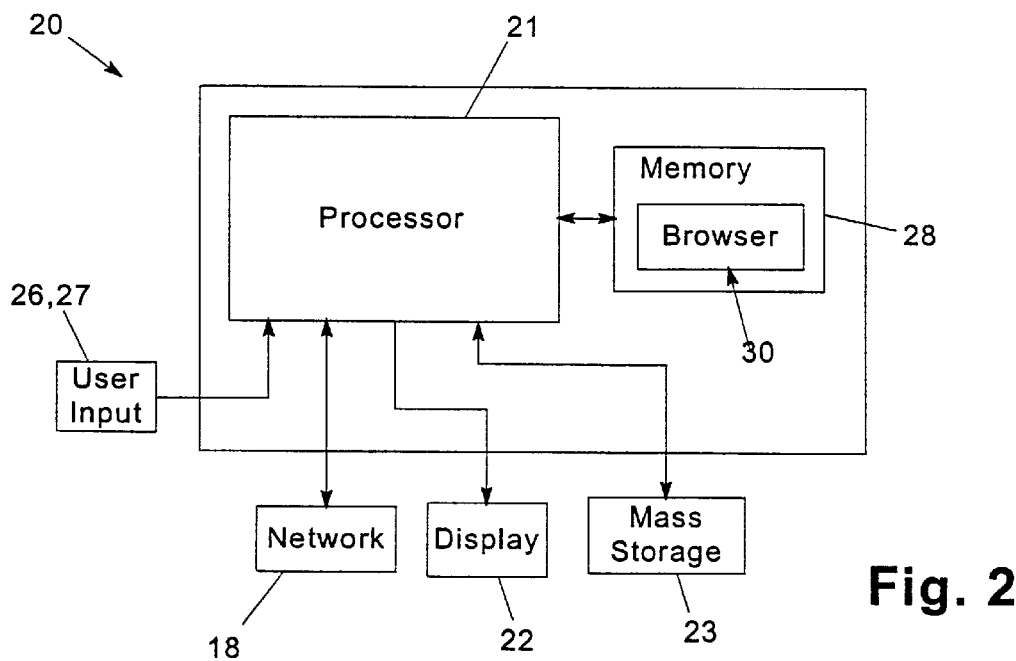
FIG. 2 is a block diagram of an exemplary environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Other suitable user interface devices may include, for example, a remote control, a trackball, a joystick, a touch pad, and an Accupoint input device, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An exemplary embodiment of the invention is implemented within a hypertext (or web) browser application 30, e.g., similar to the Internet Explorer browser from Microsoft Corporation and the Navigator browser from Netscape Communications. It should be appreciated, however, that the invention may also be implemented in other applications that utilize user interface controls, and specifically hypertext links, as well as directly within the operating system or other support software of a computer system consistent with the invention.

Browser 30 is illustrated in FIG. 2 as being resident in memory 28. However, it should be appreciated that various components of the application may be stored on network 18 or mass storage 23 prior to start-up, and in addition, that various components may be resident at different times in any of memory 28, mass storage 23, network 18, or within registers and/or caches in processor 21.

It should also be appreciated that other software environments may be utilized in the alternative.

Pointer Focus for Hypertext Links

The exemplary embodiments of the invention generally operate by defining input regions around user interface controls such as hypertext links that are configured to receive user input for the associated controls whenever a user-actuated pointer is disposed within such regions. An input region typically includes a first portion that overlaps a display region of a hypertext link, and a second portion that extends beyond the display region. In the alternative, the input region may be defined wholly outside of the display region of the hypertext link.

Typically, the display region of a hypertext link includes the extent of the actual text and/or image data forming the display representation of the hypertext link. While the invention is not limited to a specific hypertext link format, one particularly useful application of the invention is in conjunction with hypertext links defined in an HTML document such as an Internet document. Principally three types of hypertext links are defined by the HTML protocol. A first type of hypertext link is defined by a text string including a plurality of alphanumeric characters that are typically highlighted (e.g., through underlining and a unique color) to set the characters off from surrounding text, whereby the display region thereof is the boundary of the display representation of the text string. A second type of hypertext link is defined by a graphical image having a border that defines the display region thereof. Yet another type of hypertext link is defined by a predetermined display region specified within an image map. In this latter type of hypertext link, multiple links may be defined in a common graphical image by defining coordinates, and optionally, a shape (e.g., a rectangle, a circle or a polygon) within the graphical image. With this latter type, therefore, the display region is coextensive with the boundary defined in the definition of the image map.

The display region of a hypertext link may also include a degree of whitespace surrounding such data, e.g., for alphanumeric hypertext links, blank characters disposed between multiple words in a hypertext link, as well as the whitespace within a character box defined for each character in a hypertext link. For example, it should be appreciated that a line of text in a hypertext browser has a line height, with each character in that line being disposed within a rectangular box having the same height as that of the line, and with a width that is proportional or fixed depending upon the display font used to represent the link. For image-type hypertext links, as well as hypertext links defined in an image map, similar whitespace may be defined by the author of a document by defining the border of the active area of the hypertext link accordingly.

Figure 3:
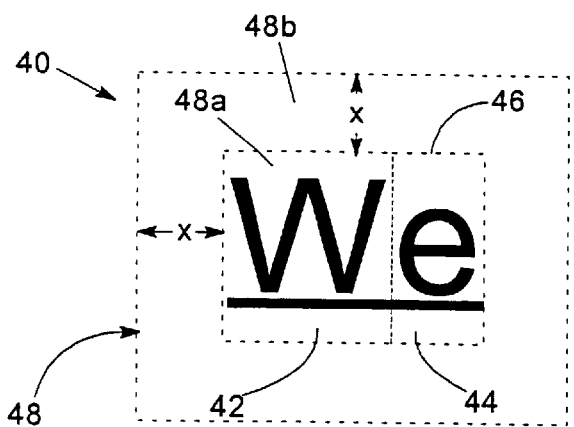
FIG. 3 is a block diagram of a hypertext link consistent with the invention.

As shown in FIG. 3, for example, character boxes 42 and 44 are illustrated respectively for the letters "W" and "e" of a hypertext link 40, with the boundaries of these boxes 42, 44 defining the display region 46 of the display representation of the hypertext link. The characters are disposed in a proportional font, and as such, the width of each character box is variable while the height thereof is constant. For a fixed font, the width of each character box is typically constant for a given font size. The display region 46 may therefore be seen to include the small amount of whitespace within each character box 42, 44.

An input region 48 is defined around hypertext link 40, with a first portion 48a overlapping display region 46, and a second portion 48b extending beyond display region 46. In other embodiments, input region 48 may be considered to exclude the area overlapped by display region 46.

The size and shape of input region 48 may vary for different implementations. For example, input region 48 is illustrated as a rectangle that extends in each direction beyond display region 46 by a distance x. In other implementations, it may be desirable to utilize other shapes, e.g., circles, ovals, squares, etc. for the input region. Moreover, while input region 48 is illustrated as centered on the display region, the input region may be offset from the display region, and may instead extend predominantly in a given direction in the alternative. The input region may also only partially overlap a display region, and may not extend beyond a display region in all directions. Furthermore, the input region may be predefined, or may be customized by a user if desired. Other alternative configurations of an input region will be apparent to one of ordinary skill in the art.

Figure 4:
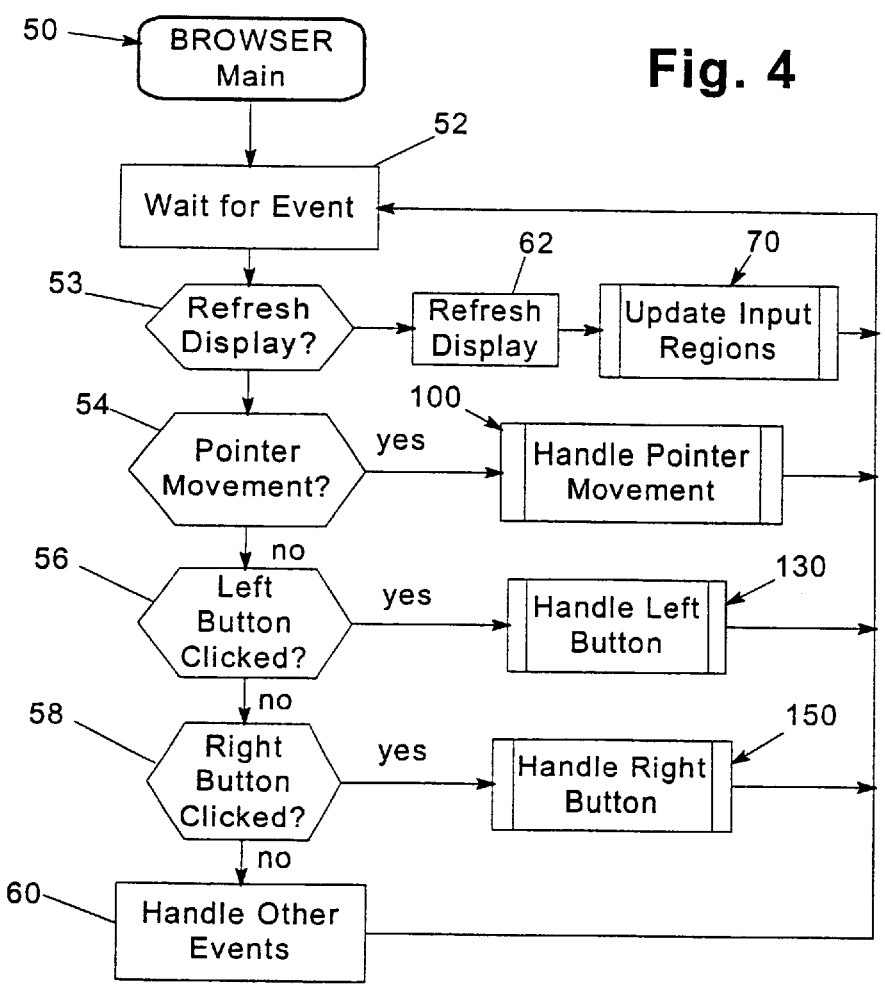
FIG. 4 is a flowchart illustrating the program flow for the main routine of the browser of FIG. 2.

FIG. 4 illustrates an exemplary program flow for a main routine 50 executed by browser application 30 of FIG. 2. Routine 50 is shown implemented in an event-driven representation. However, other programming models, e.g., procedural, may be used in the alternative.

Routine 50 generally operates in an endless loop that waits for events at block 52, checks for certain specified events, processes those events, and returns to block 52 to wait for additional events.

A number of events generally related to the use of a pointer focus consistent with the invention are illustrated at blocks 53, 54, 56 and 58. Additional events conventionally handled by a browser application, but which are not relevant to an understanding of the invention, are handled in a conventional manner in block 60.

One event handled by browser 30 is a refresh display event, which is detected at block 53. This event may be initiated in any number of circumstances, e.g., whenever the browser wishes to generate a new document that has been retrieved via a hypertext link, when a user has scrolled up or down in a document, or in response to a specific command to refresh the display, among other operations.

The refresh display event is handled in block 62 by refreshing the display, a process that is well known in the art. Generally, refreshing the display encompasses rendering the source HTML information from a document into a display representation generated via the control tags embedded in the HTML document.

Once the display is refreshed, an update regions routine 70 (discussed below) is called to build a list of input regions for the various hypertext links defined in the currently-displayed HTML document.

Another event handled by browser 30 is a pointer movement event, which is detected at block 54 and handled by handle pointer movement routine 100. In addition, user depression of left and right buttons on a user interface device such as a mouse are respectively detected at blocks 56 and 58, and are respectively handled via handle left button and handle right button routines 130, 150 (also discussed below). As discussed above, other events that are not relevant to an understanding of the invention are handled in block 60.

Figure 5:
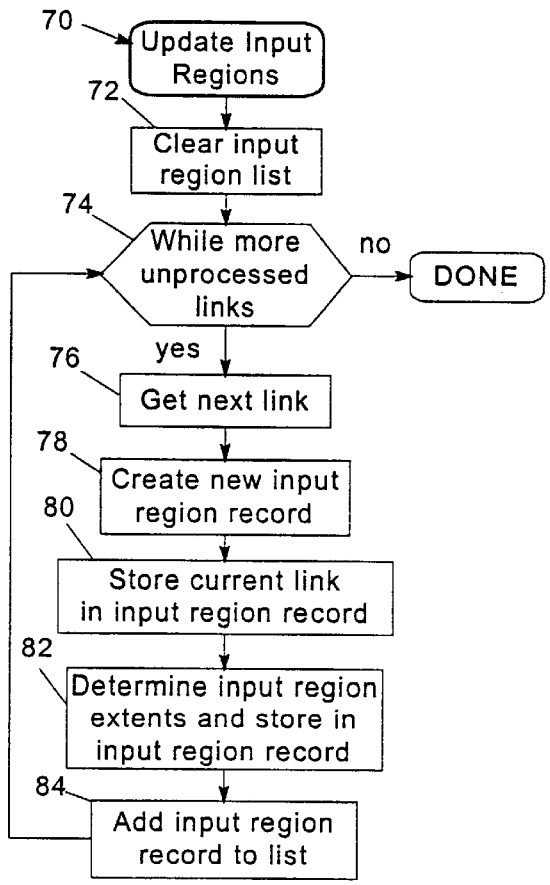
FIG. 5 is a flowchart illustrating the program flow of the update input regions routine of FIG. 4.

FIG. 5 illustrates update regions routine 70 in greater detail. Routine 70 begins in block 72 by clearing an input region data structure, e.g., by deallocating the space reserved for such a structure, or other manners known in the art.

Figure 6:
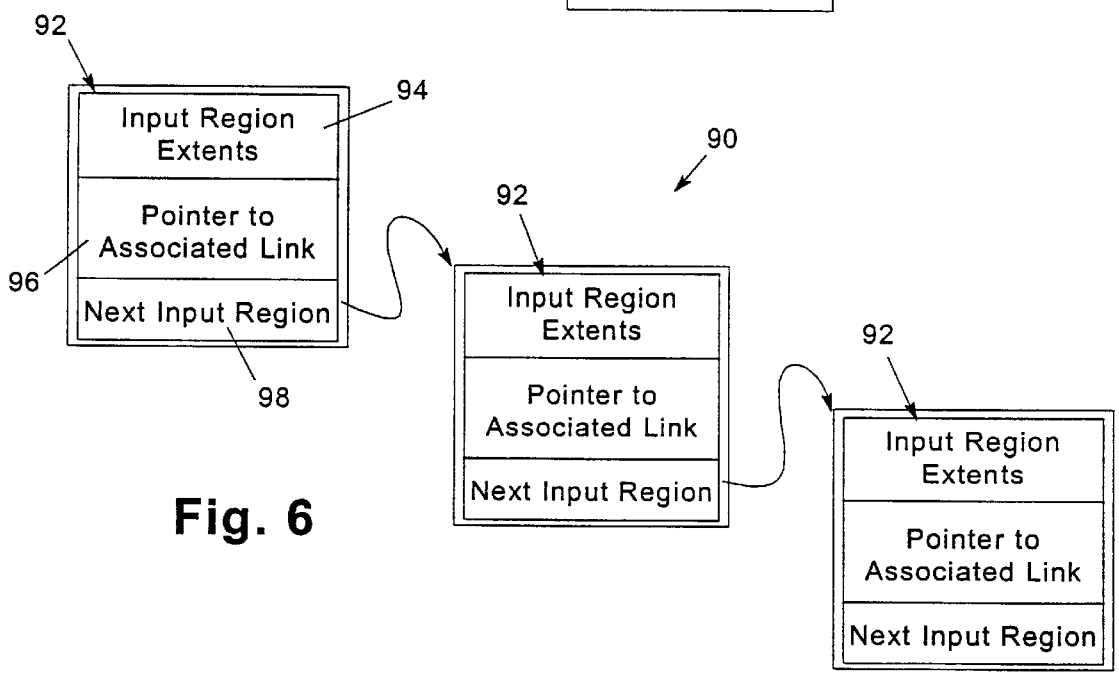
FIG. 6 is a block diagram of an input region list data structure consistent with the invention.

Any number of data structures may be utilized to store input region information for a plurality of hypertext links defined within a hypertext document. For example, FIG. 6 illustrates a linked list data structure 90 including a plurality of records 92, each of which is assigned to a particular hypertext link defined in a hypertext document. Each record 92 includes a field 94 within which is stored the extents of the input region. The extents may be defined, for example, by coordinates, by shape and/or by a combination thereof.

Moreover, the extents may be defined in absolute coordinates or in relative coordinates (e.g., relative to the coordinates of the display region of a particular hypertext link definition). As one example, each input region may be defined to extend a predetermined distance in each direction from the display region of a hypertext link.

Each record 92 also includes a field 96 including a pointer to the associated link for the record. This permits quick access to the link to be activated in response to a user operation performed while the pointer is disposed within an input region.

Each record 92 also includes a field 98 including a pointer to the next input region within the linked list data structure 90. The end of the linked list is determined by a record 92 having a NULL pointer stored in field 98.

It should be appreciated that other data structures may be used consistent with the invention.

Returning to FIG. 5, once the input region list is cleared, control passes to block 74 to initiate a WHILE loop that is executed until each hypertext link within the current document has been processed. As long as additional unprocessed links exist, control passes to block 76 to retrieve the next hypertext link. Next, in block 78 a new input region record 92 is created, e.g., by instantiating a new input region object. Next, in block 80 a pointer to the current link being processed is stored in field 96 of the new input region record 92. In the alternative, the actual URL or other address information may be stored directly in the field.

Next, in block 82, the extents of the input region are determined and stored in field 94 of the new input region record 92. Determination of the input region may be performed in a number of manners based upon the shape and relative or absolute coordinates utilized to define an input region. For example, for an alphanumeric hypertext link, one suitable manner of defining the input region may be to determine the leftmost, rightmost, topmost and bottommost coordinates of the display region of the hypertext link, and then adjust these values by a predetermined amount in each direction to define an input region that extends in all directions a predetermined amount beyond the display region (e.g., as shown in FIG. 3).

Once the input region extents are stored in record 92, the new record is added to the input region data structure 90 in block 84, typically by locating the last record in the list and setting the next input region field 98 thereof to point to the new record. Upon completion of block 84, control returns to block 74 to process additional links in the document until all such links have been processed, whereby routine 70 is then terminated.

Figure 7:
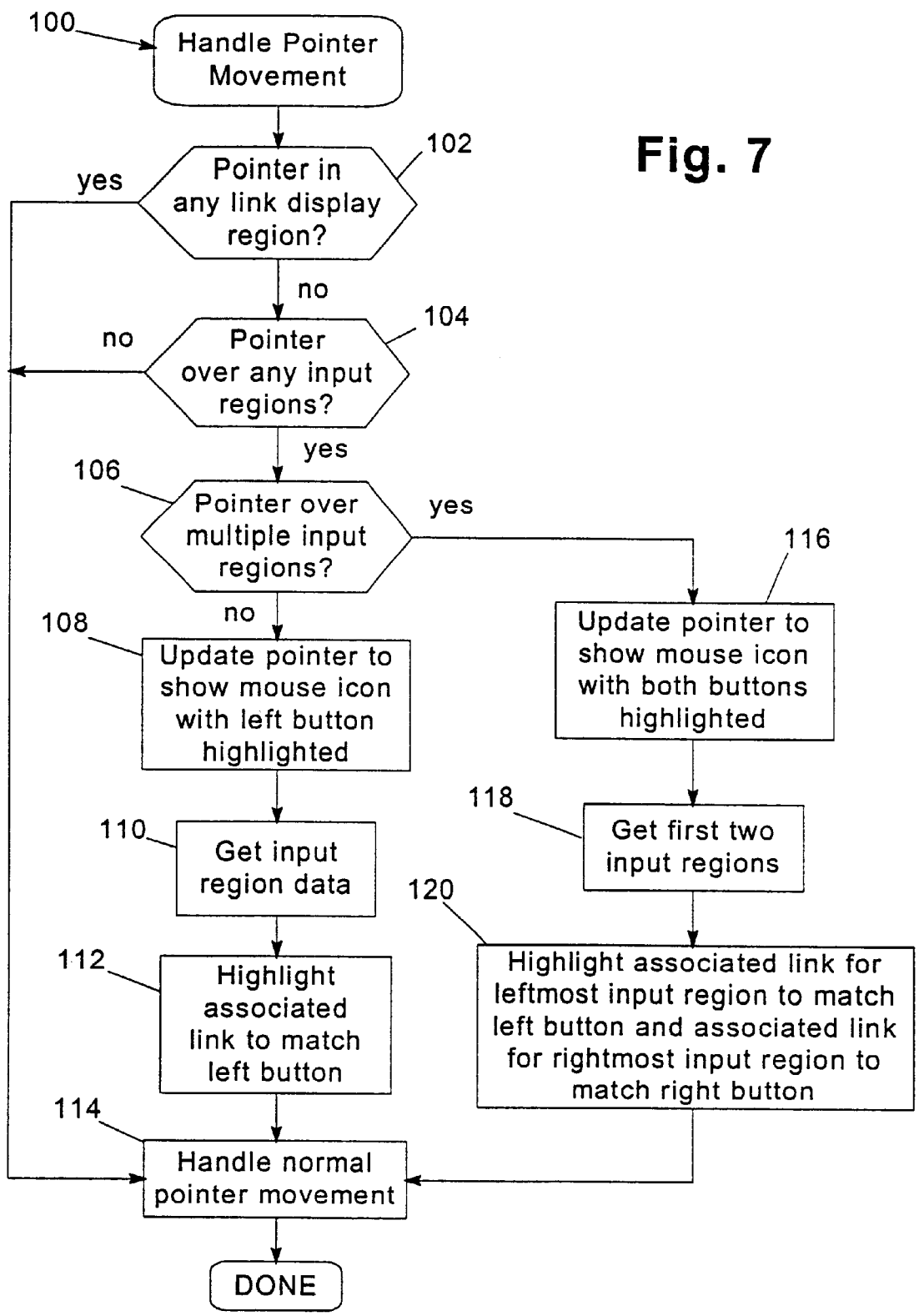
FIG. 7 is a flowchart illustrating the program flow of the handle pointer movement routine of FIG. 4.

FIG. 7 illustrates handle pointer routine 100 in greater detail. Routine 100 operates by applying suitable highlighting to hypertext links whenever a pointer is disposed with the input and/or display regions thereof. In addition, coordinated highlighting of a pointer may also be implemented to facilitate a user's recognition of the user actions that are enabled at any given time based upon the location of the pointer. It should be appreciated, however, that highlighting of a hypertext links and/or a pointer may be omitted in certain embodiments.

Routine 100 begins in block 102 by determining whether the pointer is disposed in the display region of any link. If so, no specialized processing of the pointer movement event need occur, and thus, control passes to block 114 to handle normal pointer movement. For example, it may be desirable to modify the display representation of the pointer when the pointer is disposed over the display region of a link, e.g., by displaying a graphical representation of hand as is found with many conventional browsers. In the alternative, block 102 may be omitted, whereby placement of the pointer in either the display or input region of a hypertext link is handled in the same manner.

If the pointer is not disposed within a link display region, control passes to block 104 to determine whether the pointer is disposed in any input regions. This may be performed, for example, by searching through the input region linked list data structure to find each input region having an extent that overlaps the current location of the pointer. If not, control passes directly to block 114 to handle normal pointer movement. If, however, the pointer is disposed over any input region, control passes to block 106 to determine whether the pointer is disposed over multiple input regions.

As mentioned above, it may be desirable in certain applications to provide coordinated highlighting of a pointer and a hypertext link when the pointer is disposed within the input region of the hypertext link so that a user can recognize that a given hypertext link may be activated in response to depression of a button on a user interface device when the pointer is disposed within the input region. In some applications, it may be sufficient to simply highlight the hypertext link whenever the pointer is disposed within the input region thereof. In other embodiments, it may be desirable to also highlight the pointer in a fashion which provides a visual link between the hypertext link and the pointer.

One manner of providing a visual link between a pointer and a hypertext link is to utilize a display representation of a pointer that mimics a user interface device such as a mouse, with the display representation of the pointer in the hypertext link coordinated in such a manner that the user can recognize that depression of a specific button on the user interface device will activate the hypertext link.

As shown, for example, by block 108, which is called in response to the pointer being disposed over a single input region, the pointer may be updated to display a mouse icon having left and right buttons, with the left button highlighted, e.g., through a specific color representation, or in other manners which will be apparent to one of ordinary skill in the art. It should be appreciated that other graphical representations may be used in the alternative.

Next, in block 110, data from the input region that is overlapped by the pointer is retrieved. Then, in block 112, the associated link for the input region is highlighted to match the highlighting of the left button of the mouse icon used to represent the pointer. For example, the link may be highlighted with a common color with the left button of the mouse icon so that the user may recognize that depression of the left button will actuate the highlighted hypertext link. Upon completion of block 112, control passes to block 114 to handle any additional pointer movement processing that is required, in a manner well known in the art. Routine 100 is then complete.

Returning to block 106, if it is determined that the pointer is disposed over multiple input regions, control is passed to block 116 to update the pointer to show a mouse icon having both buttons highlighted, indicating that both primary and secondary operations may be performed with respect to a pair of hypertext links. The left and right buttons may be highlighted in different colors or with other visually distinct representations to distinguish the buttons, as well as their associated links, from one another.

Next, in block 118, the first two input regions over which the pointer is disposed are retrieved. In many instances, only two input regions will be overlapped, and thus, the first two input regions are simply the two overlapped regions for the given position of the pointer. If more than two regions are overlapped by the pointer, a conflict resolution mechanism typically must be utilized to select two regions from the multiple input regions. One manner of resolving conflict is to select the two regions that the pointer is mostly in (i.e., where the pointer location is closer to the centers of the regions). In the alternative, the first two input regions may be assigned based upon a hierarchy defined for each input region (e.g., by assigning each region to a different layer). Other manners of resolving such conflicts may be utilized in the alternative.

Once the two input regions are determined, block 120 is executed to highlight the associated link for the leftmost input region to match the highlighting of the left button of the mouse icon for the pointer. In addition, the associated link for the rightmost input region is assigned to match the highlighting for the right button displayed on the mouse icon representation of the pointer. This indicates to the user that depression of the left button will actuate the leftmost hypertext link, while depression of the right button will perform a similar operation for the rightmost link. Upon completion of block 120, control passes to block 114 to handle any additional normal pointer movement operations, whereby routine 100 is then complete.

Various modifications may be made to routine 100 consistent with the invention. For example, rather than requiring the pointer to be disposed over multiple input regions, a secondary input region may be defined even when the pointer is disposed only over a single input region, whereby the secondary input region will be visually linked with the right mouse button displayed in the pointer representation. For example, it may be desirable to select the closest input region other than that over which the pointer is disposed as the secondary input region. In the alternative, the last (most recent) input region over which the pointer was disposed may be assigned as the secondary input region.

Other manners of visually linking the pointer to the hypertext links may also be used in the alternative. For example, other than using coordinating colors, other font attributes, such as font size, font type, font style, etc., may be utilized to highlight a link and/or pointer. Moreover, other graphical representations than a mouse may be utilized for a pointer to visually link the pointer with the hypertext links. Moreover, as mentioned above, it may be desirable to only highlight a hypertext link and omit any visual link with the pointer.

Figure 8:
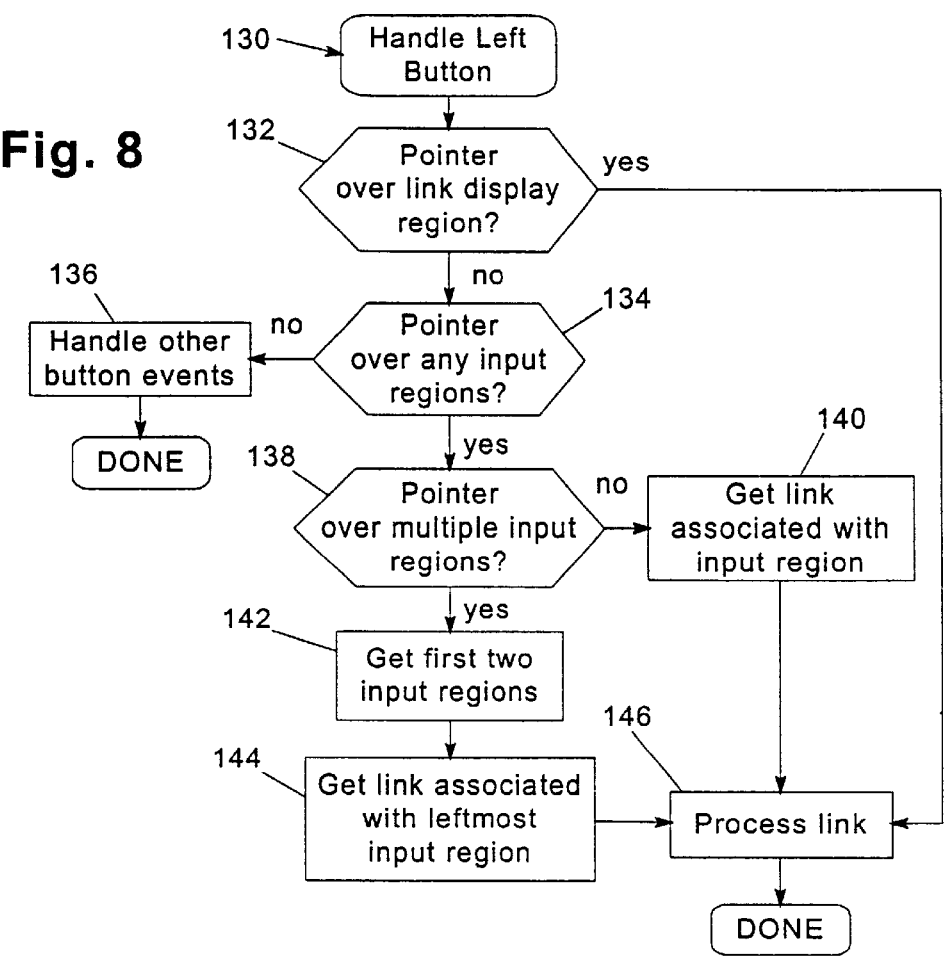
FIG. 8 is a flowchart illustrating the program flow of the handle left button routine of FIG. 4.

FIG. 8 illustrates handle left button routine 130 in greater detail. It should be appreciated that the designation of buttons on a user input device as "left" and "right" buttons is merely one possible assignment of operations for a given device, and that other buttons and user-actuated controls may be used to perform predetermined operations consistent with the invention (e.g., keys on a keyboard). "Left" and "right" buttons may also be considered to be "primary" and "secondary" buttons, since some operating systems permit users to switch the functions of left and right buttons to accommodate left-handed operation. Also, some mouse user input devices include more than two buttons, so additional operations may be assigned to such additional buttons in a similar manner to that described herein.

Routine 130 begins at block 132 by determining whether the pointer is disposed over the display region of any hypertext link. If so, control passes directly to block 146 to process the link in a manner known in the art. Typically, this encompasses actuating the hypertext link and navigating to the new document and/or position in a document as specified by the definition of the hypertext link. In the alternative, block 132 may be omitted to provide the same functionality regardless of whether a pointer is within the display or input region of a hypertext link.

If the pointer is not disposed within the display region of a hypertext link, control passes to block 134 to determine whether the pointer is disposed over any input regions defined for the hypertext links within a document, an operation that is performed in the same manner as described above for block 104 of FIG. 7. If the pointer is not disposed over any input regions, control passes to block 136 to handle other button events in a manner known in the art. For example, the button may have been depressed over another object in the browser, e.g., a scroll bar, a tool bar button, a menu, etc., whereby conventional processing of these other events is handled.

Returning to block 134, if the pointer is disposed over any input regions, control passes to block 138 to determine whether the pointer is disposed over multiple input regions. If not, control passes to block 140 to retrieve the link associated with the overlapped input region. The link is retrieved by accessing the record for the input region and obtaining therefrom the associated hypertext link. Control then passes to block 146 to process the link, typically by actuating the link and navigating to the document and/or location specified thereby. Routine 130 is then complete.

Returning to block 138, if it is determined that the pointer is disposed over multiple input regions, the first two input regions overlapped by the pointer are retrieved in block 142, in a similar manner to block 118 of FIG. 7. Next, the link associated with the leftmost input region is retrieved in block 144. The leftmost input region is typically determined by locating the input region having the leftmost extent among the overlapped input regions on the computer display. In the alternative, the left button may be assigned to a particular input region based upon other criteria, e.g., whether the link was the most recently overlapped, or whether the link has a higher priority than the other hypertext links on a document. Once the link associated with the leftmost input region is retrieved, control passes to block 146 to process the link as described above, whereby routine 130 is then complete.

Figure 9:
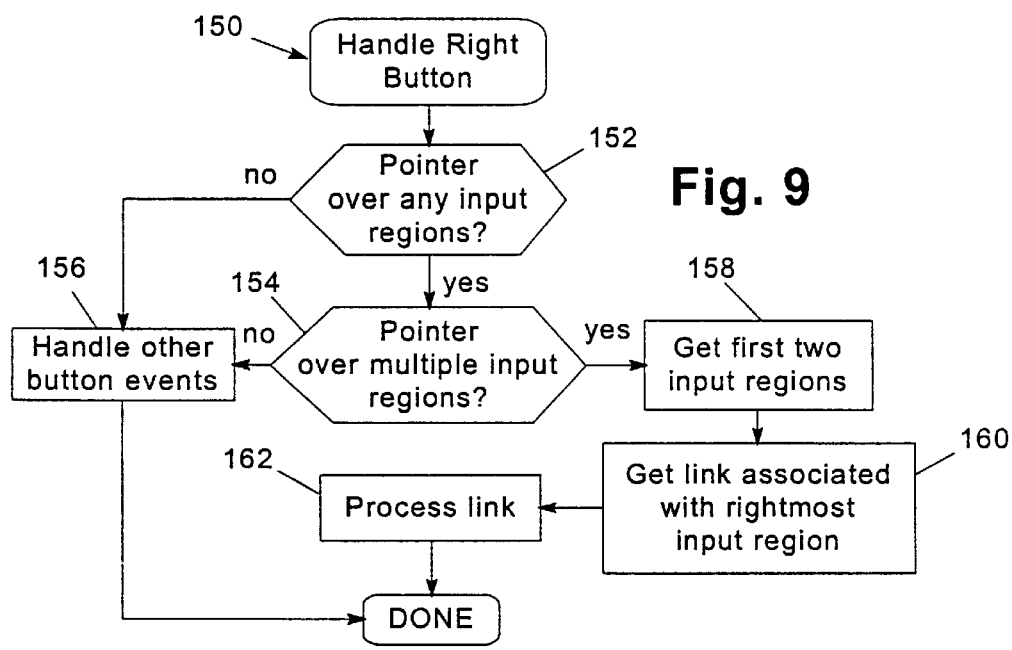
FIG. 9 is a flowchart illustrating the program flow of the handle right button routine of FIG. 4.

Handle right button routine 150 is illustrated in greater detail in FIG. 9. Routine 150 implements a secondary function that permits a predetermined operation to be performed on a secondary hypertext link when the pointer is disposed within the input region of a given hypertext link. Typically, but not always, the secondary function is selection, or activation, of the secondary hypertext link. Moreover, the secondary function is enabled in response to a predetermined condition, which may be any number of conditions, including that the pointer is also disposed within the input region of the secondary hypertext link, that the pointer was most recently in the input region of the secondary hypertext link (excluding the primary hypertext link), that the pointer is closest to the input region of the secondary hypertext link (excluding the primary hypertext link), among others.

Routine 150 begins in block 152 by determining whether the pointer is disposed over any input regions, in a manner similar to that described above for routines 100 and 130. If the pointer is not disposed over any input regions, control passes directly to block 156 to handle the right button depression event in a manner known in the art. If, however, the pointer is disposed over an input region, control passes to block 154 to determine whether the pointer is disposed over multiple input regions. If not, control also passes to block 156 to handle the button event in a conventional manner. For example, it may be desirable when the pointer overlaps only a single input region to open a pop-up menu associated with the hypertext link associated with the single input region, which performs an operation similar to a right button depression occurring while a pointer is disposed over a display region of a hypertext link in a conventional browser.

If the pointer is disposed over multiple input regions, control is then passed to block 158 to retrieve the first two input regions in the same manner as described above with respect to block 118 of FIG. 7. Next, block 160 retrieves the link associated with the rightmost input region. The rightmost input region is typically determined by finding the input region having the rightmost extent. In the alternative, the rightmost input region may be defined as the input region for a secondary hypertext link relative to a primary link. For example, a secondary hypertext link may be defined as the next to last hypertext link over which the pointer was disposed, or the next to closest hypertext link to the current position of the pointer, among other alternatives.

Once the link associated with the rightmost input region is retrieved, control passes to block 162 to process the link, typically by actuating the link and navigating to the document and/or location specified thereby. Upon completion of block 162, routine 150 is then complete.

Figure 10:
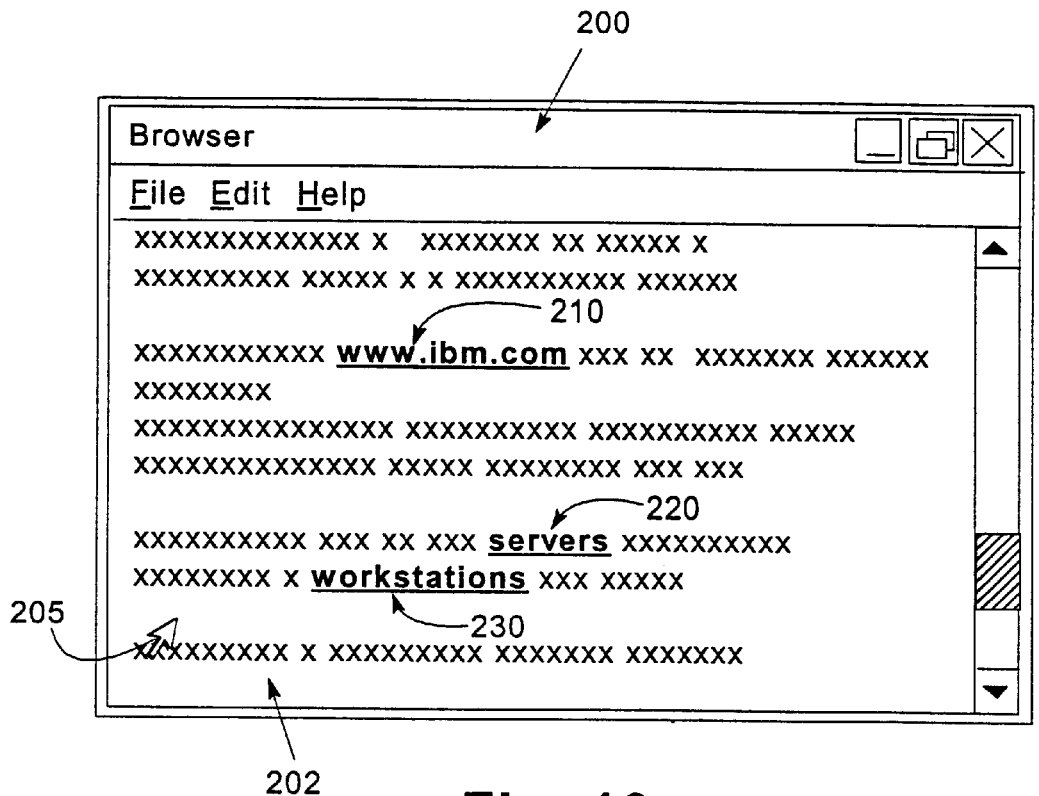
FIG. 10 is a block diagram illustrating an exemplary hypertext document displayed in a window on the computer system of FIG. 1.

As an illustrative example of the operation of browser 30, a display representation 200, having displayed therein a hypertext document 202, is presented in FIG. 10. A pointer 205 is shown disposed within display representation 200, and hypertext document 202 is illustrated with three hypertext links 210, 220 and 230.

Figure 11:
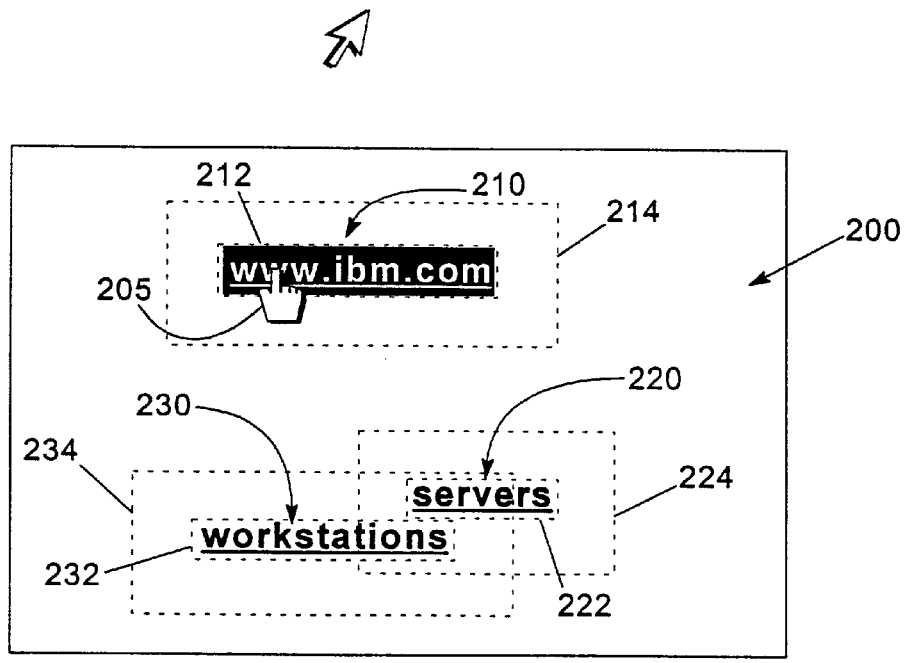
FIG. 11 is a simplified block diagram of the hypertext document of FIG. 10, with a pointer located within a display region of a hypertext link.

As shown in FIG. 11, for example, each hypertext link 210, 220, 230 may have defined therefor an associated display region 212, 222, 232 and input region 214, 224, 234. With a movement of pointer 205 to within a display region 212 of hypertext link 210, the program flow of blocks 102 and 114 is executed in routine 100, whereby the display representation of the pointer is updated to display a graphical representation of a hand, and the display representation of hypertext link 210 is highlighted, all in a manner which is well known in the art.

Figure 12:
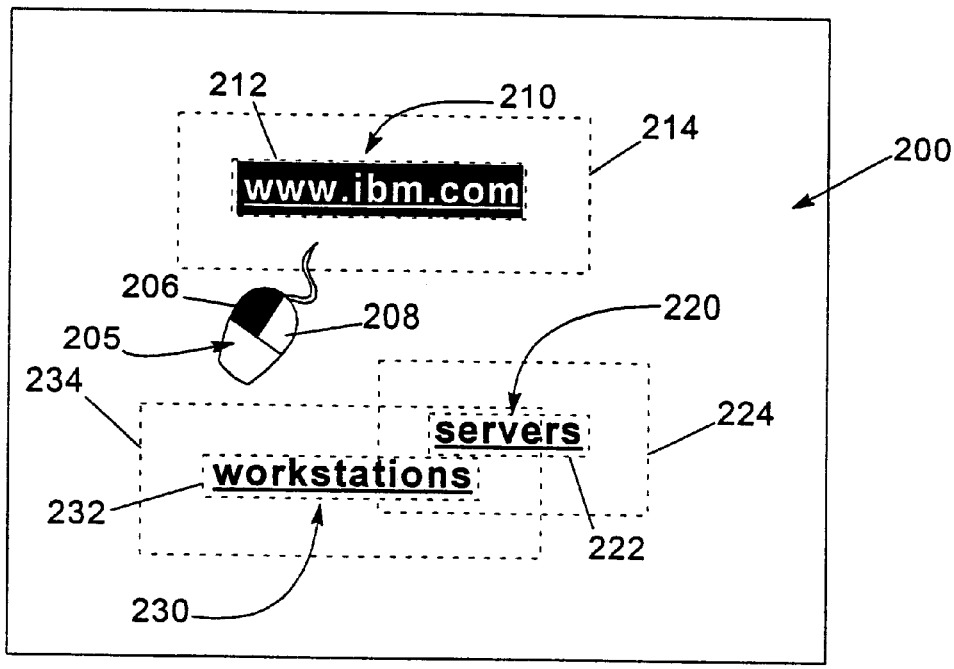
FIG. 12 is a simplified block diagram of the hypertext document of FIG. 10, with a pointer located within an input region of a single hypertext link.

Next, as shown in FIG. 12, if pointer 205 is moved such that it points to a location within input region 214 of hypertext link 210, routine 100 of FIG. 7 follows the program flow through blocks 102, 104, 106, 108, 110, 112 and 114 of routine 100 to (1) highlight the display representation of hypertext link 210, and (2) update the pointer 205 to display a graphical representation of a mouse with a left button (illustrated by darkened portion 206) highlighted in a corresponding fashion with the display representation of hypertext link 210. Given that the pointer is disposed within a single input region, no special highlighting is provided for the right mouse button, represented by portion 208. It should therefore be appreciated that the depression of the left mouse button when the pointer is disposed at this position will actuate hypertext link 210 (e.g., FIG. 8 through the program flow of blocks 132, 134, 138, 140 and 146 of routine 130).

Figure 13:
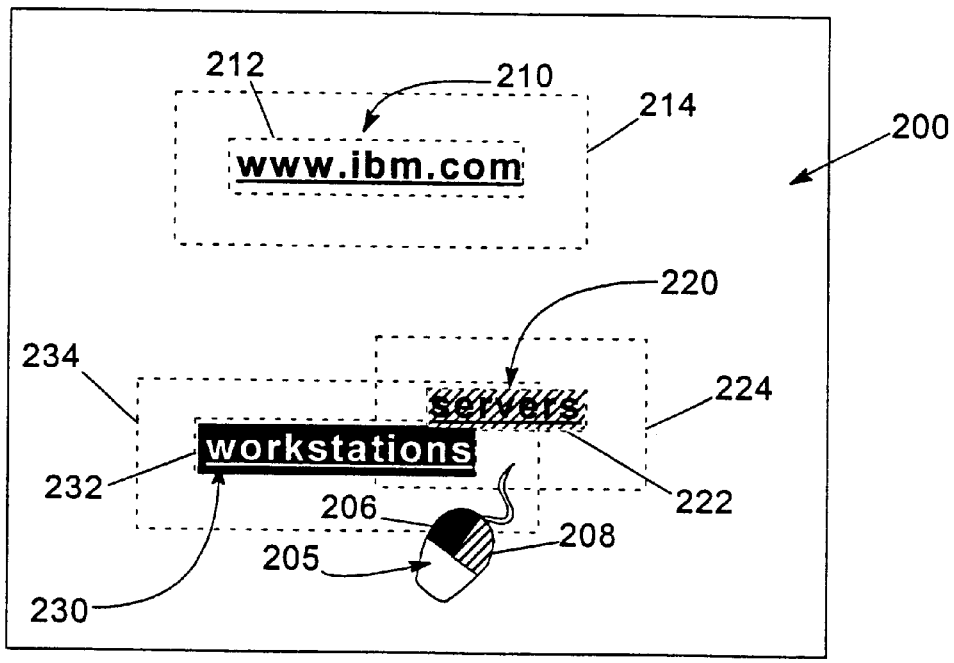
FIG. 13 is a simplified block diagram of the hypertext document of FIG. 10, with a pointer located within the input regions of multiple hypertext links.

FIG. 13 illustrates movement of pointer 205 to a position within both input regions 224, 234 of hypertext links 220, 230. In this position, routine 100 of FIG. 8 follows the program flow of blocks 102, 104, 106, 116, 118, 120 and 114, resulting in the display representation of hypertext link 230 being highlighted in a coordinating fashion with left button portion 206 of pointer 205, and with the display representation of hypertext link 220 being highlighted in a coordinating fashion with the right button portion 208 of pointer 205.

Depression of the left mouse button at this position results in routine 130 of FIG. 8 following the program flow of blocks 132, 134, 138, 142, 144 and 146 to actuate hypertext link 230. Similarly, depression of the right mouse button in this position results in a call to routine 150 of FIG. 9, whereby the program flow of blocks 152, 154, 158, 160 and 162 is followed to actuate hypertext link 220.

Various modifications may be made to the above-described embodiments without departing from the spirit and scope of the invention. For example, operations other than actuating a hypertext link may be performed in response to user input received while a pointer is disposed within an input region, e.g., opening a pop-up menu, among others. In addition, various aspects of the invention may be utilized in conjunction with user interface controls other than hypertext links, e.g., push buttons, pop-up buttons, radio buttons, edit boxes, combo boxes, list boxes, counters, checkboxes, and other graphical user interface (GUI) controls known in the art. In particular, the ability to provide secondary operations for additional user interface controls when a pointer is disposed within the input region of one control may provide significant productivity gains, particularly when multiple user interface controls are closely packed together in a particular area of a computer display.

Moreover, it should be appreciated that other user interface devices, including various numbers and combinations of buttons and the like, may be used to initiate predetermined operations consistent with the invention. Furthermore, the boundary of an input region may or may not be displayed on the computer display.

Other modifications will be apparent to one of ordinary skill in the art. Therefore, the invention lies solely in the claims hereinafter appended.

What is claimed is:

1. A method of receiving user input with a computer system, the method comprising:

(a) displaying a display representation of a first hypertext link on a computer display, the display representation including a first display region defined by the extent of the display representation;

(b) performing a first predetermined operation with the hypertext link in response to user input received while a pointer is located in a first input region for the first hypertext link, wherein at least a portion of the first input region is disposed outside of the first display region; and (c) performing a second predetermined operation with a second hypertext link in response to user input, wherein the second hypertext link includes a second display representation displayed on the computer display, the second hypertext link having a second input region associated therewith, the second predetermined operation being performed in response to user input received while the pointer is located in the first input region and in the second input region, wherein performing the first predetermined operation is responsive to depression of a first button on a user interface device, and wherein performing the second predetermined operation is responsive to depression of a second button on the user interface device.

2. The method of claim 1, wherein performance of the second predetermined operation is selectively enabled under a predetermined condition and wherein a third display representation of a third hypertext link is displayed on the computer display, wherein the predetermined condition includes the second display representation being closer to the location of the pointer than the third display representation.

3. The method of claim 1, wherein a performance of the second predetermined operation is selectively enabled under a predetermined condition and wherein a third display representation of a third hypertext link is displayed on the computer display, wherein the predetermined condition includes the pointer being located within the second input region more recently than a third input region defined for the third hypertext link.

4. The method of claim 1, wherein performance of the second predetermined operation is selectively enabled under a predetermined condition and wherein the second display representation is selectively highlighted whenever the predetermined condition is met.

5. The method of claim 4, further comprising selectively highlighting the first and second display representations with visually distinct representations from one another when the pointer is disposed within the first input region.

6. The method of claim 5, further comprising visually linking first and second portions of a display representation of the pointer to the first and second display representations, respectively, when the first and second display representations are highlighted.

7. The method of claim 6, wherein selectively highlighting the first and second display representations includes displaying the first and second display representations in first and second colors, respectively, and wherein visually linking includes displaying the first color in the first portion and the second color in the second portion.

8. A method of receiving user input with a computer system, comprising:
(a) respectively displaying first and second display representations of first and second user interface controls on a computer display, the first display representation including a first display region defined by the extent of the first display representation, and the second display representation including a second display region defined by the extent of the second display representation;
(b) performing a first predetermined operation with the first user interface control in response to first user input received while a pointer is located in a first input region of the first user interface control, wherein at least a portion of the input region is disposed outside of the display region; and
(c) performing a second predetermined operation with the second user interface control in response to second user input received while the pointer is located in the first input region of the first user interface control.

9. The method of claim 8, wherein the second user interface control includes a second input region, at least a portion of which is disposed outside of the second display region, the method further comprising selectively enabling performance of the second predetermined operation while the pointer is located in the first input region only under a predetermined condition.

10. The method of claim 9, further comprising selectively highlighting the second display representation whenever the predetermined condition is met.

11. The method of claim 10, further comprising selectively highlighting the first and second display representations with visually distinct representations from one another when the pointer is disposed within the first input region.

12. The method of claim 11, further comprising visually linking first and second portions of a display representation of the pointer to the first and second display representations, respectively, when the first and second display representations are highlighted.

13. A computer system, comprising:
(a) a computer display; and
(b) a processor, coupled to the computer display, the processor being configured to,
(a) display a display representation of a first hypertext link on the computer display, the display representation including a display region defined by the extent of the display representation;
(b) perform a first predetermined operation with the first hypertext link in response to user input received while a pointer is located in a first input region for the hypertext link, wherein at least a portion of the first input region is disposed outside of the display region; and
(c) perform a second predetermined operation with a second hypertext link in response to user input, wherein the second hypertext link includes a second display representation displayed on the computer display, the second hypertext link having a second input region associated therewith, the second predetermined operation being performed in response to user input received while the pointer is located in the first input region and in the second input region, wherein performing the first predetermined operation is responsive to depression of a first button on a user interface device, and wherein performing the second predetermined operation is responsive to depression of a second button on the user interface device.

14. The computer system of claim 13, wherein performance of the second predetermined operation is selectively enabled under a predetermined condition and wherein the processor is further configured to display a third display representation of a third hypertext link on the computer display, wherein the predetermined condition includes the second display representation being closer to the location of the pointer than the third display representation.

15. The computer system of claim 13, wherein performance of the second predetermined operation is selectively enabled under a predetermined condition and wherein the processor is further configured to display a third display representation of a third hypertext link on the computer display, wherein the predetermined condition includes the pointer being located within the second input region more recently than a third input region defined for the third hypertext link.

16. The computer system of claim 13, wherein performance of the second predetermined operation is selectively enabled under a predetermined condition and wherein the processor is further configured to selectively highlight the first and second display representations with visually distinct representations from one another when the pointer is disposed within the first input region and the predetermined condition is met.

17. The computer system of claim 16, wherein the processor is further configured to visually link first and second portions of a display representation of the pointer to the first and second display representations, respectively, when the first and second display representations are highlighted.

18. A program product, comprising:
(a) a program configured to perform a method of receiving user input with a computer system, the method comprising:

(1) displaying a display representation of a hypertext link on a computer display, the display representation including a first display region defined by the extent of the display representation;
(2) performing a first predetermined operation with the first hypertext link in response to user input received while a pointer is located in an input region for the hypertext link, wherein at least a portion of the input region is disposed outside of the display region; and
(3) performing a second predetermined operation with a second hypertext link in response to user input, wherein the second hypertext link includes a second display representation displayed on the computer display, the second hypertext link having a second input region associated therewith, the second predetermined operation being performed in response to user input received while the pointer is located in the first input region and in the second input region, wherein performing the first predetermined operation is responsive to depression of a first button on a user interface device, and wherein performing the second predetermined operation is responsive to depression of a second button on the user interface device; and (b) signal bearing media bearing the program.

19. The program product of claim 18, wherein the signal bearing media is transmission type media.

20. The program product of claim 18, wherein the signal bearing media is recordable media.

* * * * *

UNITED STATES PATENT AND TRADEMARK OFFICE
CERTIFICATE OF CORRECTION

PATENT NO. : 6,374,272 B2
DATED : April 16, 2002
INVENTOR(S) : Cary Lee Bates and Paul Reuben Day It is certified that error appears in the above-identified patent and that said Letters Patent is hereby corrected as shown below:

<u>Column 13,</u>
Line 47, after "received" insert -- by depressing a first button on a user interface device --.
Line 53, after "received" insert -- by depressing a second button on the user interface device --.
Line 54, after "control" insert -- and in a second input region of the second user interface control --.

Signed and Sealed this

Eighteenth Day of June, 2002

Attest:

JAMES E. ROGAN
Attesting Officer      Director of the United States Patent and Trademark Office